INVENTOR:
JACQUES MAHO

INVENTOR:
JACQUES MAHO
By
Richardson, David and Nordon
ATTYS

INVENTOR:
JACQUES MAHO

United States Patent Office 2,711,128
Patented June 21, 1955

2,711,128

DIFFUSING DUCTS FOR THE VENTILATION OF CEREALS OR GRANULAR PRODUCTS STORED IN SILOS OR WAREHOUSES

Jacques Maho, Larchmont, N. Y.

Application August 14, 1951, Serial No. 241,828

4 Claims. (Cl. 98—56)

The present invention relates to diffusing ducts for the ventilation of cereals or granular products stored in silos or warehouses.

Grain consists of living particles which "breathe." They consume oxygen, using it for burning the sugar coming from their starch and producing carbon dioxide and water vapour. The more they breathe the more their weight diminishes. Activity increases with temperature and water content.

Consequently for storing grains it is necessary to ventilate them periodically to remove the carbon dioxide in which they are bathed and which tends to produce fermentation. This ventilation also has for its object to cool them and to dry them.

To this end a known technique consists in causing passage-ways to pass through the grain for introducing air into the mass of grains to be conditioned and these ducts should ensure a good distribution of the air in the centre of the grain mass while opposing the entry of the grains into the ducts.

These ducts may also serve for the withdrawal of the air from the mass of the grains, which air may either come from one or more other ducts or from the free surface of the pile of grain.

Ventilation installations are often very large and the present invention has for its object diffusing ventilating ducts or walls which are easy and economical to construct and to instal and which present very valuable diffusing characteristics.

According to the invention horizontal or vertical ventilation ducts or walls, through which air is introduced or blown into the mass of grain, or drawn off this mass, comprises one or more expansion chambers permitting the ventilation air to enter the mass of the grain or to leave it through a relatively large surface in relation to the outlet or inflow air orifices.

The procedure of the invention is shown by Figs. 1a and 1b indicating respectively a vertical section made transversely through a horizontal passage-way or duct and a vertical section across the axis of a vertical duct.

Referring to Fig. 1a a horizontal duct will be seen itself placed on the floor S of the warehouse. This duct is covered by the mass of grain G. It will be noted that this duct is formed by the channel R feeding the ventilation air. The roof T supports the weight of the grain and opposes the entry of the grain into the channel R. Between the roof T and the upper edges of the channel are provided two slots F which occupy the whole length of the passage-way. The lower end of the roof reaches a level below that of the upper edge of the channel and is spaced from the vertical wall of this channel so as to provide an expansion chamber D which is defined on the one hand by the inside of the roof and by the vertical part of the channel, and on the other hand by the slope E of piling of the grain of which the angle of inclination is variable according to the granularity of the stored products. The expansion chamber D extends the whole length of the ducts and its value resides in the fact that it permits ventilation air to enter or leave the mass of the grains by the large surface a—b which permits obtaining good aeration by utilising only a relatively small air pressure, the air passage surface through the interstices between the grain and the surface a—b not being less than the surface of the slot through which air enters or leaves through the channel. The arrows of Fig. 1b indicate the air streams in the direction in which these are blown into the mass of grain, but the advantages of the invention are retained when the direction of ventilation is reversed.

It should be understood that the position of the lower edges of the roof can vary according to the inclination of the flow slope of the stored material but it will always be important that the surface a—b should be as large as possible.

Referring to Fig. 1b the method of the invention will be seen applied to vertical ventilation ducts. P is the vertical wall of the warehouse. The air pipe is shown at C and the wall of this pipe comprises from place to place horizontal aeration slots L. Each of these slots is covered by a screen A preventing the grain G from entering the pipe-way C. In the example previously defined the stored products G form a flow slope a—b the surface of which is made as large as possible.

In the case of horizontal ducts the relative positions of the roof and the channel are maintained by frames arranged from place to place along the diffusing duct thus formed.

The channel may comprise only vertical walls the base of this channel being formed by the floor of the warehouse.

These walls may be disposed obliquely to the floor so as to give the conduit the sectional form of a regular trapezium, the larger base of this trapezium being the lower or upper part of the conduit.

In certain embodiments the conduits may be formed of vertical walls near the ground and oblique towards the outside at the upper part of the conduit.

The roof covering these various forms of channel may have a semicircular section or be formed by two plane parts meeting one another and making a more or less obtuse angle between them.

The ducts which have been defined are provided with two diffusion slots but ventilation ducts can be designed having three or four diffusion slots or more as required.

The ducts are generally placed on the floor of the warehouse but they may be elevated and to this end the frames used are provided with suitable supports.

In certain cases the ventilation ducts instead of being placed on the floor of the warehouse are arranged horizontally along a vertical wall of the warehouse. There would then be utilised diffusing ducts formed by a conduit comprising a vertical wall and a horizontal wall, the second vertical wall being comprised in some cases by the wall itself of the warehouse, the conduit thus formed being surmounted by a pointed roof of which the slot is directed towards the interior of the warehouse, the extreme edge of this roof coming below the upper edge of the vertical wall of the conduit, a space forming a ventilation slot being thus provided between the roof and the upper edge of the vertical wall of the conduit, the relative positions of the roof and conduit being maintained by frames arranged from place to place along the diffusing ducts.

The ducts which have been defined may be duplicated by a conduit adapted to feed another diffusing duct.

In certain warehouses and in particular in silos it is important to place the diffusing ducts vertically. In this case they may be either isolated and surrounded wholly by the cereals or products to be ventilated or may be fixed vertically along the silo walls. In this latter case they may be arranged along any path of the vertical wall but they may be fixed to the corners of the silo in the case where as will be understood these comprise square or hexagonal cells.

The vertical diffusing ducts, whatever their positions, may have sections which are rectangular, trapezoidal, triangular, circular or semicircular. They are formed by vertical conduits comprising, from place to place, slots in which are fixed screens preventing the cereals or other products to be ventilated from entering the interior of the duct. These screens occupy the whole periphery of the duct and serve as expansion chambers for the ventilation air leaving the slots.

The vertical ducts may be formed of various materials, sheet metal, wood and so on. They may also be made of concrete and in the latter case formed of identical elements each comprising a part of the duct wall, a diffusion slot and a screen preventing the cereals or products to be ventilated from entering the diffusing duct formed by the assembly of the elements which have been defined.

Several embodiments of the invention will be described hereinafter by way of example with reference to the accompanying drawings and in which:

Figs. 1 and 2 are respectively a transverse section and a profile of a first embodiment of the invention, Figs. 1a and 1b are explanatory views, already referred to, showing the arrangement of the ducts in relation to the flow slope of the stored grain.

Figs. 3 and 4, 5 and 6, 7 and 8, 9 and 10 also represent in section and in profile, modifications of the arrangement of horizontal ventilation ducts.

Figure 16:
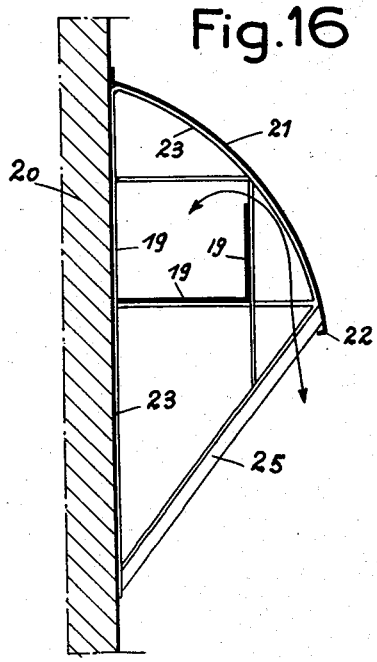
Figure 18:
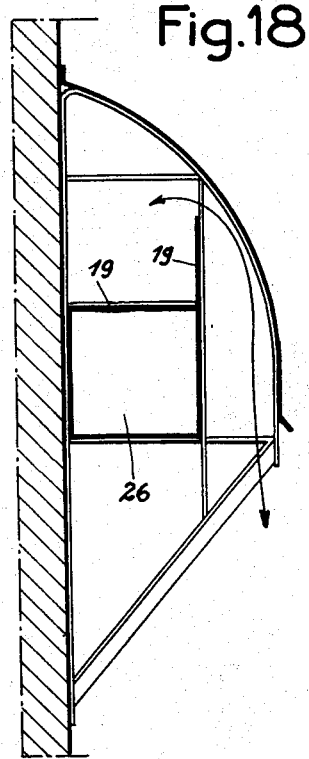
Figure 17:
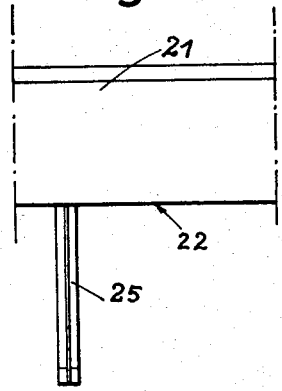
Figure 19:
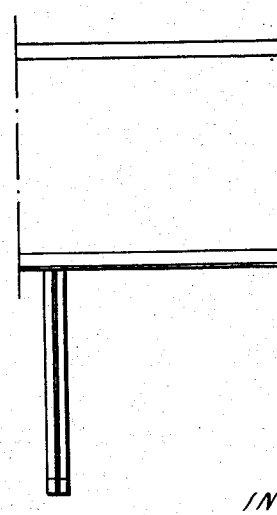

Figs. 16 and 17 show in section and profile a diffusion duct intended to be placed horizontally along a vertical wall, Figs. 18 and 19 show a modification of the duct of Figs. 16 and 17.

Figure 1:
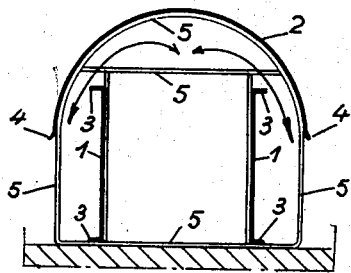
Figure 2:
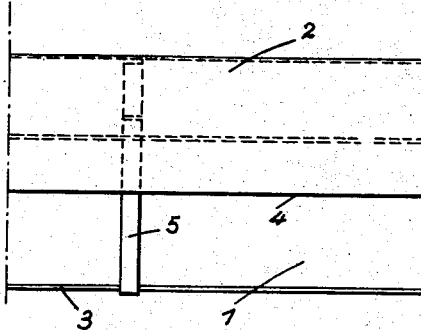

Referring to Figs. 1 and 2 it will be seen that the diffusing duct comprises two vertical walls 1 forming the conduit properly speaking and the roof 2 preventing the goods or cereals from entering the duct while leaving all along the duct an expansion chamber corresponding to each ventilation slot.

The walls 1 have their ends turned over at 3 in such manner as to strengthen the said walls in the direction of their length.

The roof has a semi-circular section and the lower edges 4 of this roof come lower than the upper edges of the walls, so as to oppose any entry of the cereals. The ventilation air or fluid escapes through the slots along the arrows and expands into the mass of the products to be ventilated through the expansion chamber formed by the roof.

The different parts forming the ducts are supported by steel strip frames 5 arranged from point to point along the ventilation ducts, the said different parts being fixed to the frames by welding or by means of rivets or bolts.

Figure 3:
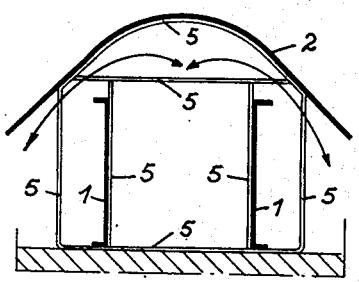
Figure 4:
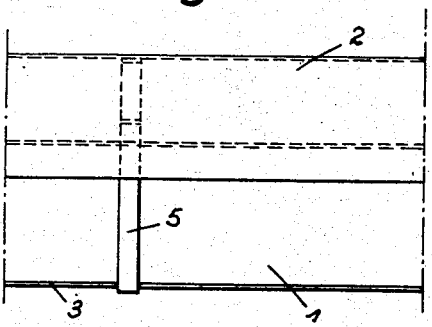

The edges of the roof of the duct may stretch further from the duct and this variation of construction is shown by Figs. 3 and 4.

Figure 5:
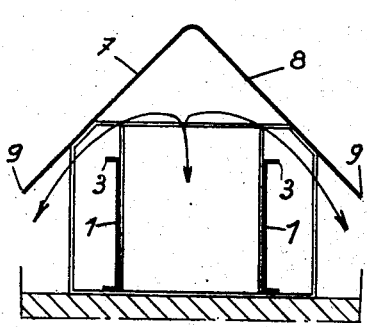
Figure 6:
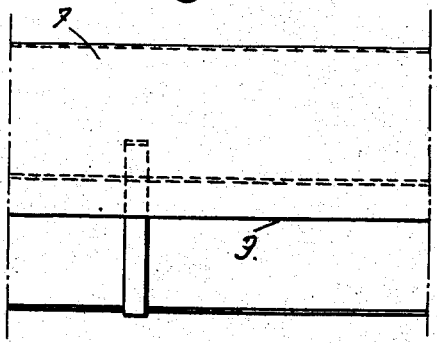
Figure 1A:
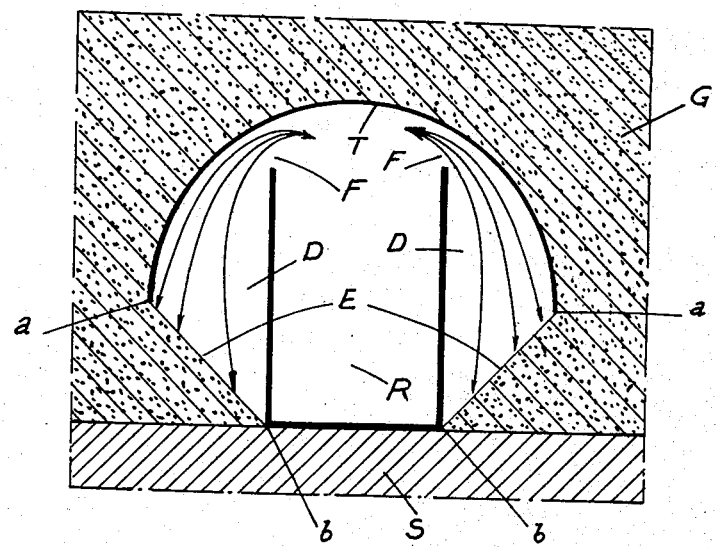
Figure 1B:
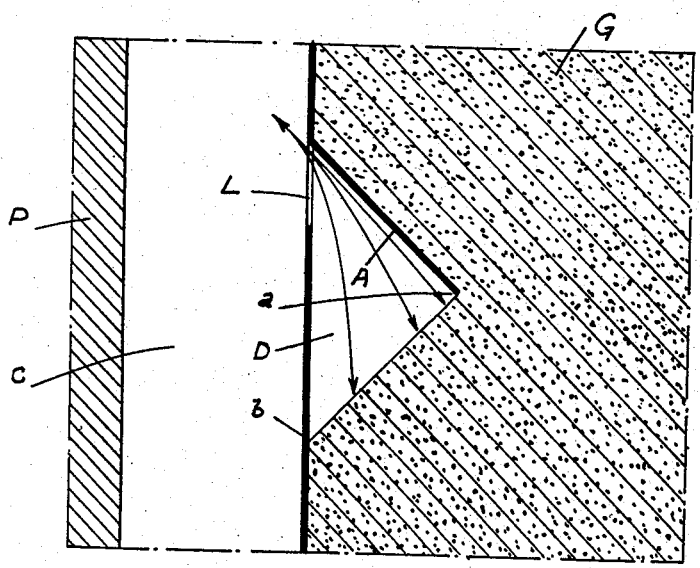

It is also possible, see Figs. 5 and 6, to arrange the roof of the duct in the form of two intersecting straight portions 7 and 8 of which the ends 9 come lower than the upper parts 3 of the walls 1 of the conduit.

Figure 7:
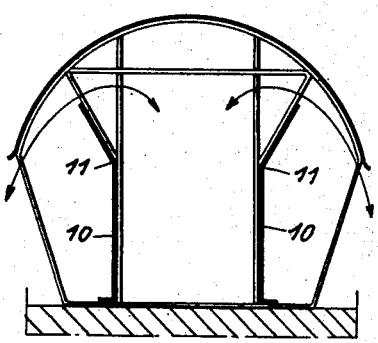
Figure 8:
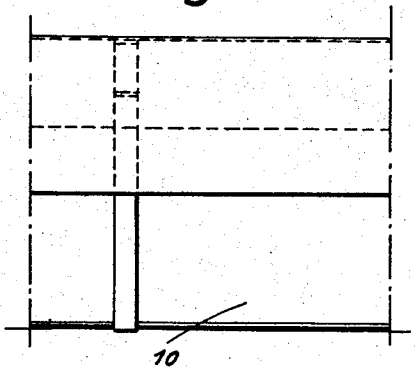

Figs. 7 and 8 show a modification of the conduit using walls 10 which comprise a longitudinal bend 11 giving the conduit a widened-out form.

Figure 9:
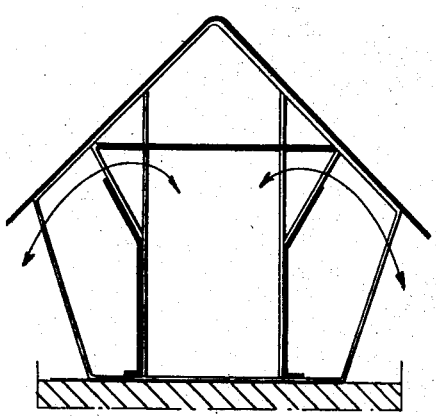
Figure 10:
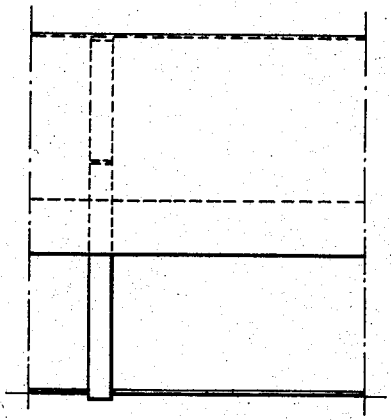

Figs. 9 and 10 show the combination of the conduit having a widened-out section with a roof formed of two intersecting straight parts.

Figure 11:
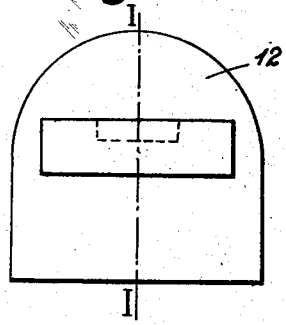
Figs. 11 and 12 are respectively an elevation and section on the line I—I of Fig. 11, of the terminal part placed at the end of the ventilating ducts intended to ensure the ventilation of the grain near the warehouse walls.
Figure 12:
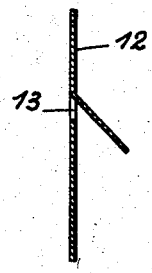

One or both ends of the ducts which have been defined are terminated by members opposing the inflow of the cereal into the ducts, permitting ventilation near the walls of the warehouse. One of these parts which can be used with the duct of Fig. 1 is shown in Figs. 11 and 12. It comprises a cover 12 fixed to the conduit and to the roof of the duct. This cover 12 comprises a ventilation slot 13 provided with a screen 14 opposing the inflow of the cereals.

Figure 13:
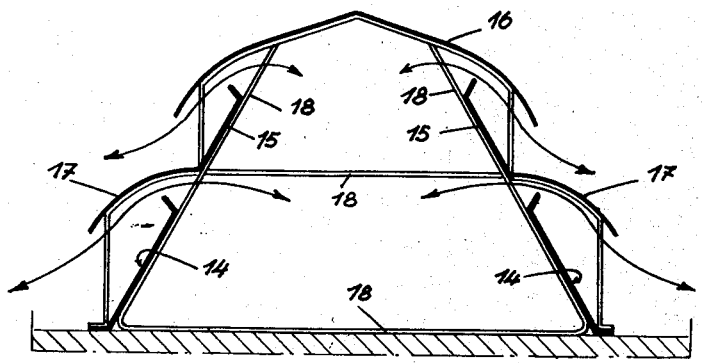
Figs. 13 and 14 show in section and profile a duct with four diffusing slots.
Figure 14:
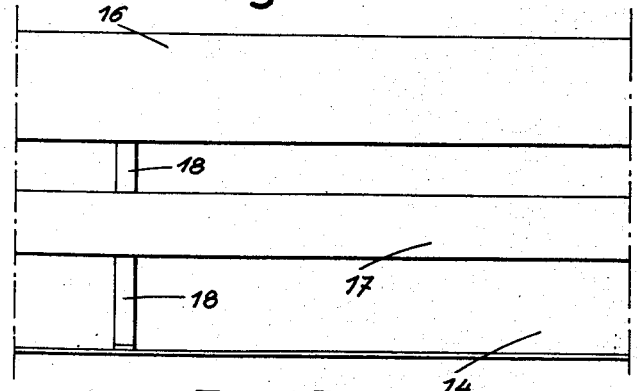

Referring to Figs. 13 and 14 a horizontal duct will be seen comprising four diffusing slots. This duct is formed by the walls 14 and 15, by the roof 16 in two sections and by the screens 17, these various parts being held together by means of steel strip frames 18 arranged as before from place to place along the duct. It should be remarked that the walls 15 and the screens 17 are made of the same piece of sheet metal.

Figure 15:
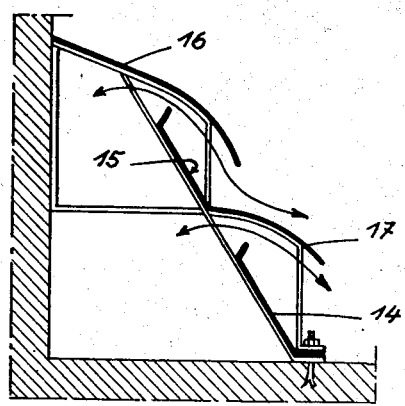
Fig. 15 shows in section a horizontal angle-shaped duct with two ventilation slots.

Fig. 15 shows a duct intended to be placed on the floor of the warehouse along one of its vertical walls. This arrangement is derived from the construction described above. It embodies the roof 16, the walls 14 and 15 and the screen 17.

Figs. 16 and 17 show a duct intended to be placed horizontally along a vertical wall of the warehouse. Fig. 17 is made on a smaller scale than Fig. 16. The duct is composed of walls 19 which co-operate with the wall 20 of the warehouse to form the ventilation passage. A roof with one straight part 21 of which the slope is directed towards the interior of the warehouse, covers the conduit. The lower end 22 of the roof 21 is situated at a lower level than that of the upper end of the wall 19. The roof 21 and the walls 19 are supported by the frames 23 arranged from point to point along the ducts. These frames are supported by struts formed by the T bars 25.

Figs. 18 and 19 show a modification of the construction in which there is provided, besides the conduit formed by the parts 19, a second conduit 26 the purpose of which is to feed a diffusion duct formed at its end.

The ducts which have been defined, whether they are vertical or horizontal may be made of any suitable materials such for example as sheet metal, wood, fibro-cement, or the like.

What I claim is:

1. A horizontal diffusing duct for granaries comprising a channel conduit, a plurality of frames attached intermittently along the duct, a roof concave with respect to the conduit and spaced therefrom by said frames, the sides of the conduit comprising a pair of substantially vertical walls the tops of which diverge with respect to each other and extend toward said roof, thereby providing a restricted elongated space between the roof and conduit, the outer edges of said roof coming below the upper edges of the channel conduit and diverging therefrom continuously, the outer edges of said roof being disposed at a distance from the base of said conduit greater than the distance between said tops of said walls and said roof, thereby permitting a substantial expansion of the ventilating fluid upon passage beyond said restricted opening.

2. A duct according to claim 1, wherein the base of the conduit is formed by the floor of the granary and the sides of the conduit comprise two parallel vertical walls.

3. A duct according to claim 1, wherein the concave roof covering the channel is arcuate in cross-section and does not exceed 180 degrees.

4. A duct according to claim 1, wherein the concave roof is substantially angular in cross-section, the ends diverging towards the floor.

References Cited in the file of this patent

UNITED STATES PATENTS

| | | |
|---|---|---|
| 125,169 | Chichester | Apr. 2, 1872 |
| 203,036 | Hazen | Apr. 30, 1878 |
| 1,214,033 | Hercer | Jan. 30, 1917 |
| 2,196,391 | Gronert | Apr. 9, 1940 |
| 2,299,299 | Bills | Oct. 20, 1942 |
| 2,572,955 | Schumacher | Oct. 30, 1951 |

FOREIGN PATENTS

| | | |
|---|---|---|
| 74,403 | Switzerland | July 2, 1917 |
| 303,003 | Germany | Jan. 15, 1918 |
| 745,376 | France | Feb. 14, 1933 |